United States Patent
Brust et al.

(10) Patent No.: US 8,623,126 B1
(45) Date of Patent: Jan. 7, 2014

(54) PIGMENT-BASED INKJET INKS

(75) Inventors: Thomas B. Brust, Webster, NY (US);
Yongcai Wang, Rochester, NY (US);
Brian P. Cleary, Webster, NY (US);
Dale E. DeCann, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/537,704

(22) Filed: Jun. 29, 2012

(51) Int. Cl.
*C09D 11/02* (2006.01)

(52) U.S. Cl.
USPC ............... 106/31.65; 106/31.75; 106/31.86

(58) Field of Classification Search
USPC ................... 106/31.65, 31.75, 31.85
See application file for complete search history.

(56) References Cited

U.S. PATENT DOCUMENTS

| | | | |
|---|---|---|---|
| 7,981,947 B2 | 7/2011 | Yatake | |
| 8,013,035 B2 | 9/2011 | Saito et al. | |
| 2007/0225401 A1* | 9/2007 | Sarkisian et al. | 523/160 |
| 2009/0170986 A1 | 7/2009 | Brust et al. | |

* cited by examiner

*Primary Examiner* — Kaj K Olsen
*Assistant Examiner* — Veronica F Faison
(74) *Attorney, Agent, or Firm* — Andrew J. Anderson; Raymond L. Owens

(57) ABSTRACT

An inkjet ink composition comprising: (a) water; (b) dispersed pigment particles; and (c) at least one humectant; wherein the pigment particles are present from about 4.5% by mass to about 10% by mass, and the pigment particles have a mass weighted mean Stoke's diameter of from about 35 nm to about 70 nm wherein the Stoke's diameter is determined by differential centrifugal sedimentation of the particles through a fluid in a disc centrifuge. The present invention employs specified sedimentation particle sizing criteria for selection of appropriate pigment particle sizes at high pigment concentrations to obtain improved ink performance. Further embodiments of the invention also demonstrate that the criticality of humectant types and levels employed in an ink can also become much more important at high pigment loading in order to obtain desired performance.

21 Claims, No Drawings

PIGMENT-BASED INKJET INKS

FIELD OF THE INVENTION

The invention relates generally to the field of pigment-based inks for inkjet printing, and in particular to inks with high pigment loading and specific pigment particle size distributions for improved reliability and redispersibility of pigment-based inkjet inks.

BACKGROUND OF THE INVENTION

Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught and recycled to an ink sump. Inkjet printers have found broad applications across markets ranging from desktop document and photographic-quality imaging, to short run printing and industrial labeling.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment inks can have inferior durability after printing, especially under conditions where abrasive forces have been applied to the printed image and especially at short time intervals from immediately after printing to several minutes while the inks are drying.

Pigment inks can be difficult to jet through ink jet print heads having small nozzle diameters especially by the thermal ink jet printing process. In recent years, thermal ink jet printers have moved to higher jetting frequencies and smaller nozzle diameters to provide faster printing speeds with higher image quality. Thermal ink jet printers are now capable of printing (in drop volumes of 3 picoliters or less) at jetting frequencies in excess of 10 kHz and the need for higher frequency firing is a highly desirable feature. However, this high frequency firing often comes at the cost of variability in the firing velocity, which leads to poor image quality in the final printed image. In addition, the demands of current thermal ink jet printing require that the nozzles fire reliably for a large number of firings during the life-time of a printer. As an example, a typical ink jet nozzle may be required to fire in excess of $5 \times 10^7$, and up to as many as $1 \times 10^9$, individual firing events without malfunctioning or ceasing to fire altogether.

Another problem for drop-on-demand inkjet printing devices, especially those using pigment inks, is the recovery of a nozzle that has not been fired for a period of time such that the ink in the chamber has begun to dry out. This can occur during the time required to print a document if only certain inks are required for that document and the remaining inks remain idle. This phenomenon is typically referred to in the art as latency. Most ink jet printers will fire idle nozzles at specified intervals to maintain the reliable firing of all the jets. Unfortunately, pigment inks, and in particular pigment inks with high loads of pigment and polymers designed for high image quality and durability on the broadest range of media, can still show poor reliability even with reasonable idle-jet maintenance routines. If an ink requires excessive amounts of maintenance firing, this can also reduce the number of pages that can be printed from an ink tank, thereby reducing the efficiency of the tank and increasing the cost of printing.

Additional reliability problems can occur in situations where the printhead is left idle or uncapped for long periods of time and then is actuated again to eject ink. In some instances the idle printhead nozzles can partially clog or crust with ink components thereby degrading the ability of the printhead to eject properly. For example, the ink can be misdirected from the partially clogged nozzles or the drop velocity can be greatly diminished. In some instances, the nozzle will become permanently clogged and in other instances a lengthy and costly maintenance operation may be required to recover the nozzle back to a usable state of operation.

An important attribute for pigment-based inks, especially those with high loading of pigments and polymers is the ability of fresh ink to redissolve and redisperse ink that has dried in or around the nozzles. An ink that easily redissolves will readily recover even if the print head is allowed to dry, and will generally be more reliable during normal operation and latency conditions. The ability of an ink to redissolve is easily tested by allowing a specific amount of ink to dry out under specified conditions and then observe if that ink redissolves into a specified amount of fresh ink. An ideal ink will quickly redissolve all of the dried ink without forming visible particles or chunks. An ink with poor redissolution properties will not dissolve the dried ink or at best will only break it up into large chunks or particles that still may clog a print head nozzle.

Pigment-based inks formulated with polymeric dispersants and binders can be difficult to jet through inkjet printheads having small nozzle diameters especially by the thermal inkjet printing process. This is especially true of pigment-based inks, which are formulated with humectants or penetrants that lower dynamic surface tension.

Ink jet inks employing pigment dispersions that also include pyrrolidinone compounds to improve the jetting reliability are disclosed in Brust et al., US2009/0170986, Yatake, U.S. Pat. No. 7,981,947, and Saito et al., U.S. Pat. No. 8,013,035. The use of pigment levels in inkjet inks up to 10 wt % is generally described in the prior art, although use of pigment concentrations of 4 wt % and less are frequently employed to avoid printer reliability problems.

PROBLEM TO BE SOLVED BY THE INVENTION

Pigment-based inks can provide high optical density on plain office papers. The compositions of plain office papers, however, can vary, especially the low-cost light-weight papers widely used for normal office operation, and can produce a wide range of optical densities with some papers having very low and non-uniform ink adsorption on the paper fibers resulting in low optical density and poor image quality. The formulation of pigment-based inks with relatively high loading of pigments can improve the optical density on most plain papers, but the high level of pigment and any associated polymer dispersants and binders can cause a wide variety of reliability problems that are related to the tendency of high solids inks to have very high viscosity as they begin to dry out and more importantly, poor redissolution properties once they have dried.

Although the use of pigment-based inks with high pigment loads have found use in inkjet printers there remains the need to provide pigmented inkjet inks that are simultaneously capable of providing high optical density and image quality on plain papers without degrading the jetting reliability of the printer. It is therefore an object of this invention to provide an inkjet ink, and an ink set including two or more colored inks for inkjet printing, wherein the inks contain a high loading of pigment particles which jet from a thermal inkjet printhead at high frequency and with low velocity variability, and which provide reliable jetting and print head recovery as expected from good redissolution properties. It is a further objective of the present invention that the pigmented ink compositions containing the high loading of pigment particles provide excellent image quality on the various compositions of plain office papers. It is a further object of the invention to provide inks which remain stable over time and are free of precipitated components. It is also an object of embodiments of this invention to provide for improved paper curl performance.

SUMMARY OF THE INVENTION

In accordance with one embodiment, the invention is directed towards an inkjet ink composition comprising;
(a) water,
(b) dispersed pigment particles, and
(c) at least one humectant,
wherein the pigment particles are present from about 4.5% by mass to about 10% by mass, and the pigment particles have a mass weighted mean Stoke's diameter of from about 35 nm to about 70 nm wherein the Stoke's diameter is determined by differential centrifugal sedimentation of the particles through a fluid in a disc centrifuge.

The prior art typically relies on dynamic light scattering to characterize the particle size of pigments employed therein. This characterization can be highly dependent on the composition and particle morphology leading to very large discrepancies with actual performance of an ink relative to the characterized mean particle size and size distribution. In particular, it has been found that the criticality of a specific range of particle sizes with regard to ink reliability and redispersibility when high pigment levels are employed in an ink can be masked if only light scattering methods are used. The present invention improves on the prior art by employing specified sedimentation particle sizing criteria for selection of appropriate pigment particle sizes at high pigment concentrations to obtain improved ink performance. Further embodiments of the invention also demonstrate that the criticality of humectant types and levels employed in an ink can also become much more important at high pigment loading in order to obtain desired performance. The prior art does not teach these critical relationships for high pigment load inks.

DETAILED DESCRIPTION OF THE INVENTION

The inkjet inks of the present invention are aqueous-based inks. By aqueous-based it is meant that the ink comprises mainly water as the carrier medium for the remaining ink components. In a preferred embodiment, the inks of the present invention comprise at least about 50 weight percent water. Pigment-based inks are defined as inks containing at least a dispersion of water-insoluble pigment particles. Dye-based inks are defined as inks containing at least a colored dye, which is soluble in the aqueous carrier. Colorless inks are defined as inks, which are substantially free of colorants such as dyes or pigments and as such, are not intended to contribute to color formation in the image forming process.

An ink set is defined as a set of two or more inks. The ink sets may contain inks of different colors, for example, cyan, magenta, yellow, red, green, blue, orange, violet or black. In one embodiment, a carbon black pigmented ink is used in an ink set comprising at least three inks having separately, a cyan, a magenta and a yellow colorant. Further useful ink sets also include, in addition to the cyan, magenta and yellow inks, complimentary colorants such as red, blue, violet, orange or green inks. In addition, the ink set may comprise light and dark colored inks, for example, light cyan and light magenta inks commonly used in the ink sets of wide format printers. It is possible to include one or more inks that comprise a mixture of different colorants in the ink set. An example of this is a carbon black pigment mixed with one or more colored pigments or a combination of different colored pigments or dyes in the same ink. An ink set may also include one or more colored inks in combination with one or more colorless inks. An ink set may also include at least one or more pigment-based inks in combination with additional inks that are dye-based ink.

The pigment-based inks of the present invention comprise pigment particles dispersed in the aqueous carrier. The pigment particles that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate breakup of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is optionally present in the milling step (a) in order to facilitate breakup of the pigments into primary particles. For the pigment dispersion obtained in step (a) or the ink composition obtained in step (b), a dispersant is optionally present in order to maintain particle stability and prevent settling. Dispersants may be added to the pigment dispersion prior to, or during the milling step (a), and include surfactants and soaps such as the potassium or sodium salt of oleoyl methyl taurate (commonly referred to as OMT) and polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; U.S. Pat. No. 6,043,297 and WO 2004/111140A1; and graft copolymers; see for example, U.S. Pat. No. 5,231,131; U.S. Pat. No. 6,087,416; U.S. Pat. No. 5,719,204; or U.S. Pat. No. 5,714,538.

Typically, these polymeric resins are copolymers made from hydrophobic and hydrophilic monomers. In this case, the copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion.

The size of pigment particles can be characterized by several different methods including dynamic light scattering, direct sizing by electron microscopy, or by sedimentation techniques such as the disc centrifuge method. In the present invention, a disc centrifuge technique is used to measure the particle size distribution of the pigment particles. The principle of the method is based on the size dependence of the rate of sedimentation of particles in a fluid when a centrifugal force is applied. In general, the measurement is based on the time the particles take to sediment from the top of the fluid in a disc centrifuge device to a light source near the bottom of the rotor of the device. This sedimentation time is converted to particle diameters through Stokes' Law, where the calculated Stoke's diameter (also referred to as the equivalent sedimentation speed diameter) is defined as the diameter of a spherical particle of the same constitution and sedimentation speed of the tested particle. For the disc centrifuge method, Stoke's law is modified to account for the variation in g-force with distance from the center of rotation. The modified Stoke's law equation is:

$$D = \{(18\eta \ln(R_f/R_0))/((\rho_p - \rho_f)\omega^2 t)\}^{0.5}$$

where
D is the calculated Stoke's particle diameter (cm)
$\eta$ is the fluid viscosity (poise)
$R_f$ is the final radius of rotation (cm)
$R_0$ is the initial radius of rotation (cm)
$\rho_p$ is the particle density (g/ml)
$\rho_f$ is the fluid density (g/ml)
$\omega$ is the rotational velocity (radians/sec) and
t is the time required to sediment from $R_0$ to $R_f$ (sec).

Sedimentation rates increase as the square of the particle diameter, so particles that differ in size by a small amount settle at significantly different rates. The absorption signal of the particles as they pass by the detector is related to the frequency of the particle size distribution. Based on the separation of particles, a particle size distribution is directly measured based on the modified Stoke's law equation.

The pigment dispersions employed in the invention have a mean Stoke's particle diameter of from about 35 nm to about 70 nm, preferably greater than 39.0 and less than about 70.0 nm, more preferably greater than 39.0 and less than about 57.0 nm, as measured using a disc centrifuge method. The coefficient of variation of the pigment particle size distribution (standard deviation of particle size divided by mean particle size) is preferably less than about 0.45, more preferably less than 0.40, and most preferably less than 0.35 as measured using a disc centrifuge method.

Dispersants can be non-polymeric molecules such as surfactants or soaps like the potassium or sodium salt of oleoyl methyl taurate (commonly referred to as OMT). The pigment dispersing agent can also be a polymer or copolymer with a wide range of monomer compositions that include both hydrophobic and hydrophilic functionality. The polymeric dispersant (copolymer) for the pigment is not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains may be linear or branched. Examples of methacrylic and acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof. Preferably, the hydrophilic monomer is methacrylic acid.

Typically, the weight average molecular weight of the copolymer dispersant has an upper limit such that it is less than about 50,000 Daltons. Desirably the weight average molecular weight of the copolymer is less than about 25,000 Daltons; more preferably it is less than 15,000 and most preferably less than 10,000 Daltons. The molecular weight of the copolymer has a weight average molecular weight lower limit such that it is greater than about 500 Daltons.

In one preferred embodiment the copolymer dispersants are those wherein the hydrophobic monomer is benzyl methacrylate and is present from 50 weight percent to 80 weight percent relative to the total weight of the polymeric dispersant and the hydrophilic monomer is methacrylic acid.

In a second preferred embodiment the copolymer dispersants comprises a hydrophobic monomer having a carbon chain length of greater than or equal to 12 carbons present in an amount of at least 10% by weight of the total copolymer, and more preferably greater than 20% by weight, an optional additional hydrophobic monomer comprising an aromatic group, and the hydrophilic monomer is methacrylic acid. For example, the additional aromatic group containing monomer may be benzyl acrylate or benzyl methacrylate. A preferred additional monomer is benzyl methacrylate.

The total amount of hydrophobic monomers, comprising the monomer having a chain with greater than or equal to 12 carbons and optionally, monomer containing an aromatic group, are present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%. A particularly preferred embodiment is a terpolymer of benzyl methacrylate, stearyl methacrylate and methacrylic acid.

Particularly useful polymeric pigment dispersants are further described in U.S. Application Numbers 2006/0012654 and 2007/0043144, the disclosures of which are incorporated herein by reference.

Encapsulating type polymeric dispersants and polymeric dispersed pigments thereof can also be used in the invention. Specific examples are described in U.S. Pat. No. 6,723,785, U.S. Pat. No. 6,852,777, and US Pat. App. Pub. Nos. 2004/

0132942 A1, 2005/0020731 A1, 2005/00951 A1, 2005/0075416 A1, 2005/0124726 A1, 2004/007749 A1, and 2005/0124728 A1, the disclosures of which are incorporated by reference. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, US 2003/0199614 A1; US 2003/0203988 A1; or US 2004/0127639. Microencapsulated-type pigment particles are also useful and consist of pigment particles coated with a resin film; see for example U.S. Pat. No. 6,074,467.

Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

The pigment particles of the present invention are preferably dispersed by a dispersant in an amount sufficient to provide stability in the aqueous suspension and subsequent ink. The amount of dispersant relative to pigment is a function of the desired particle size and related surface area of the fine particle dispersion. The ratio of pigment to dispersant can range from about 10:1 to about 1:1, and more preferably from about 5:1 to about 2:1. It is understood that the amount of polymer and relative ratios of the monomer constituents can be varied to achieve the desired particle stability and ink firing performance for a given pigment, as it is known that pigments can vary in composition and affinity for the dispersant.

The inks of the invention may also optionally comprise self-dispersing pigments that are dispersible without the use of a dispersant. Pigments of this type are those that have been subjected to a surface treatment such as oxidation/reduction, acid/base treatment, or functionalization through coupling chemistry. The surface treatment can render the surface of the pigment with anionic, cationic or non-ionic groups. Examples of self-dispersing type pigments include, but are not limited to, Cab-O-Jet® 200 and Cab-O-Jet® 300 (Cabot Corp.) and Bonjet® Black CW-1, CW-2, and CW-3 (Orient Chemical Industries, Ltd.).

Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention are as follows; yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including; C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as) PD Magenta EK-1 Liquid from Nippon Kayaku Kabushiki Kaisha; CAS No. 153204-88-7 sold as Intrajet® Magenta KRP from Crompton and Knowles Colors; the metal azo dyes disclosed in U.S. Pat. Nos. 5,997,622 and 6,001,161.

Also useful in the invention are polymeric dyes or loaded-dye/latex particles. Examples of polymeric dyes are described in U.S. Pat. No. 6,457,822 Bland references therein. Examples of loaded-dye/latex particles are described in U.S. Pat. No. 6,431,700 B1; US 2004/0186199 A1; US 2004/0186198 A1; US 2004/0068029 A1; US 2003/0119984 A1; and US 2003/0119938 A1.

The pigments used in the ink compositions of the invention can be present at high pigment loads, generally greater than 4.5% by weight, preferably 4.5 to 10% by weight, and more preferably from 4.5 to 7.5% by weight.

In a specific embodiment, ink compositions of the present invention further comprise, as water-miscible organic solvents, at least one pyrrolidinone compound and optionally an alternative cyclic amide such as imidazolidinone as well as other optional water miscible humectants and solvents such as glycerol, and 1,2-alkanediols having from four to eight carbon atoms. The pyrrolidinone compounds are effective as humectants that improve the reliability of the system by allowing dried ink to readily redissolve or redisperse in contact with fresh ink. Pyrrolidinone compounds such as 1-(2-hydroxyethyl)-2-pyrrolidinone can have the added advantage of reducing the tendency of office papers to curl when large regions of the paper are printed. Other cyclic amides such as imidazolidinone can be added with the pyrrolidinone compounds to further enhance the redispersability of the ink while still providing good humectant and plain paper curl properties.

Glycerol is also an effective humectant for pigment-based inks and provides stable vapor bubble formation in a thermal inkjet printhead. Glycerol is a desirable ingredient in a thermal inkjet ink since it aids in maintaining the heater surface which leads to long term printhead lifetimes. The low volatility of glycerol will cause it to remain in the dried ink for a long period of time where it can plasticize the polymers in the dried ink and thereby improve the ability of fresh ink to redissolve the dried ink. Inks formulated with some glycerol as a humectant can show good latency performance and print head recovery. Inks of the present invention in certain embodiments comprise glycerol at levels from about 0.5% to about 5%, more preferably from about 1% to about 4%, and most preferably from about 1% to 3% based on the total components of the ink.

Inks in certain embodiments of the present invention may further comprise at least one 1,2-alkanediol having from four to eight carbon atoms. Examples of 1,2-alkanediols useful in the present invention include, 1,2-butanediol, 1,2-pentanediol, 1,2-hexanediol, and 1,2-octanediol. Preferred diols for use in the present invention are 1,2-pentanediol and 1,2-hexanediol. The 1,2-alkanediols can preferably be present in the ink composition at levels from about 1% to about 5% by weight and more preferably from about 2% to about 4%. 1,2-alkanediols are known in the art of inkjet printing as penetrants or dynamic surface tension reducing agents. The presence of such diols can provide favorable interactions between the inks and the receiver elements, however, they can also severely degrade the latency performance of inks formulated with polyhydric alcohol humectants commonly used in inkjet inks, such as glycerol. For example, the addition of a 1,2-alkanediol to a glycerol based ink can reduce the latency wait times by an order of magnitude compared to inks containing no 1,2-alkanediol.

The redissolution performance of inks comprising glycerol and 1,2-alkanediols can be significantly improved in accordance with the invention by the additional presence of a pyrrolidinone compound and optionally an alternative cyclic amide such as imidazolidone. Preferred pyrrolidinone compounds include, 2-pyrrolidinone, 1-(2-hydroxyethyl)-2-pyrrolidinone, and 1-methyl-2-pyrrolidinone. The pyrrolidinone may be used alone or as a mixture of two or more such compounds. A particularly preferred pyrrolidinone is a 1-(2-hydroxyethyl)-2-pyrrolidinone. Ink compositions of the present invention can also include a combination of glycerol, a 1,2-alkanediol having from four to eight carbon atoms, a pyrrolidinone compound and a substituted urea compound such as imidazolidinone.

In certain embodiments of the invention, at least one cyclic amide compound such as a pyrrolidinone or imidazolidone compound is present in the ink composition at levels from about 6% to about 25%, more preferably from about 8% to about 20% based on the total components in the ink. In a preferred embodiment of the present invention the combination of all pyrrolidinone compounds and optionally imidazolidone comprise greater than 50%, more preferably greater than about 55% by weight, based on the sum total of all humectants including the 1,2-alkanediol. In the preferred embodiment it is desirable that the imidazolidone be present at less than 41% of the total humectants in the ink to avoid the formation of crystals in the dried ink deposits.

In addition to the pyrrolidinone compounds and the optional imidazolidone, glycerol, and 1,2-alkanediol, ink compositions useful in the invention can also comprise additional humectants. Representative examples of additional humectants which may be employed in the present invention include; (1) triols, such as; 1,2,6-hexanetriol, 2-ethyl-2-hydroxymethyl-propane diol, trimethylolpropane, alkoxlated triols, alkoxylated pentaerythritols, saccharides and sugar alcohols, (2) diols, such as ethylene glycol, diethylene glycol, triethylene glycol, propylene glycol, polyalkylene glycols having four or more alkylene oxide groups, 1,3-propanediol, 1,3-butanediol, 1,4-butanediol, 1,5-pentanediol, 1,6-hexanediol, 2-methyl-2,4-pentanediol, 1,7-hexanediol, 2-ethyl-1,3-hexanediol, 2,2,4-trimethyl-1,3-pentanediol, 1,8-octanediol; and thioglycol, or a mixture thereof. Typical aqueous-based ink compositions useful in the invention may contain 2-30 weight percent total humectant(s), more preferably from about 6-25% humectant, most preferably from about 12-24% humectant.

The ink compositions of the present may also include, in addition to the above humectants, additional other water miscible co-solvent or penetrants. Representative examples of other co-solvents useful in the aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether; and (3) sulfur-containing compounds such as 2,2'-thiodiethanol, dimethyl sulfoxide and tetramethylene sulfone.

In a preferred embodiment, the inks of the present invention comprise from about 8% to about 30% of total organic solvent, wherein total organic solvent is defined as the summation of glycerol, the cyclic amide compounds such as the pyrrolidinone compounds and imidazolidone, 1,2-alkanediol and additional humectant or penetrants. Preferably, the total organic solvent content in the ink compositions is between about 10% and about 25%. Inks having excellent redissolution performance can be realized when the total organic solvent condition is within the defined ranges.

In a specific embodiment of the invention, at least one humectant employed in the ink composition may comprise 1-(2-hydroxyethyl)-2-pyrrolidinone, 2-pyrrolidinone, imidazolidone or glycerol, or a combination of any two or more thereof. In such embodiment, the sum of the amounts of 1-(2-hydroxyethyl)-2-pyrrolidinone, 2-pyrrolidinone and imidazolidone is preferably greater than 50 weight % of the total humectant concentration of the ink composition. Further, the amount of 1-(2-hydroxyethyl)-2-pyrrolidinone is preferably at least 10 weight % of the total humectant concentration, the amount of imidazolidone is preferably less than 41% of the total humectant concentration, the amount of glycerol is preferably less than 25 weight % of the total humectant concentration, and the amount of 2-pyrrolidinone is preferably less than 25 weight % of the total humectant concentration. Ink compositions in accordance with such embodiment may further preferably comprise a 1,2-alkanediol such as 1,2-pentanediol and 1,2-hexanediol. Imidazolidone may preferably be present at greater than 0.1 weight percent to less than 13 weight percent, and the ink composition may further comprises triethylene glycol as an additional humectant.

In a further specific embodiment of the invention, the at least one humectant comprises at least 1-(2-hydroxyethyl)-2-pyrrolidinone, and imidazolidone, if present, is present in an amount less than about 7 weight %, and the sum of the amounts of 1-(2-hydroxyethyl)-2-pyrrolidinone and imidazolidone is greater than or equal to 9 weight %, the sum of the amounts of 142-hydroxyethyl)-2-pyrrolidinone and imidazolidone is greater than 50% of the total humectant concentration, and the amounts of 2-pyrrolidinone and glycerol, if present, are each less than 25% of the total humectant concentration. In such embodiment, the total humectant content is preferably from about 12 weight % to about 24 weight %, and 2-pyrrolidinone is preferably present at from 0 to less than 4 weight %, more preferably less than 2 weight %.

Ink compositions in certain embodiments of the present invention further comprise at least one water-dispersible binder, preferably a water-dispersible polyurethane compound. By water-dispersible it is meant to include individual polymer molecules or colloidal assemblies of polymer molecules, which are stably dispersed in the ink without the need for a dispersing agent. Water dispersible polyurethanes employed in the present invention may have the general formula of (I)

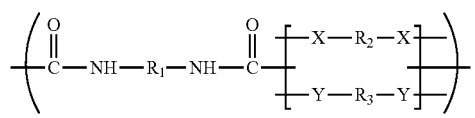

wherein $R_1$ in the structure (I) above is the central portion of the monomer unit that is the polymerization product of a diisocyanate; $R_2$ represents the central portion of a unit that is the polymerization product of at least one type of polyol or, optionally, a polyamine; $R_3$ is the central portion of a unit containing an acid group; and X and Y can be the same or different and are —O— or —N— atom.

$R_1$ is preferably a hydrocarbon group having a valence of two, more preferably containing a substituted or unsubstituted alicyclic, aliphatic, or aromatic group, preferably represented by one or more of the following structures:

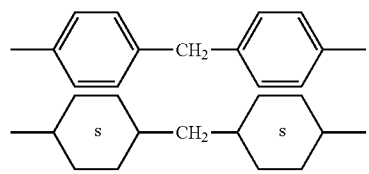

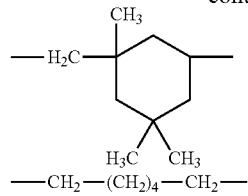

—CH₂—(CH₂)₄—CH₂—

$R_2$ preferably represents a soft segment comprising a prepolymer having ester, carbonate, or ether linkages.

The soft segment is introduced into the polyurethane backbone by using the prepolymer with both ends terminated with a hydroxyl (diol) or an amino (diamine) group. The prepolymer having terminal hydroxyl groups is known as polyols, and that having terminal amine groups is known as polyamine. Polyols useful for the practice of the invention include a) a polyester polyol obtained by, for example, esterification of a dicarboxylic acid with a diol; or ring opening reaction of a lactone (e.g. ε-caprolactone) and a diol, b) a polycarbonate polyol obtained, for example, by reacting a diols with diaryl carbonates or phosgene; and, a polyether diol, c) a polyether polyol as a condensation product of, for example, ethylene glycol, propylene glycol, or tetramethylene glycol. Preferably the polyols have a molecular weight above about 300 and below about 3000. Polyamines useful for the practice of the invention include those sold tradename JEFFAMINE® D, ED, and M series from HUNTSMAN. Another more preferred polyether diamine is a polytetrahydrofuran bis(3-aminopropyl) terminated having a molecular weight of about 1,000.

$R_2$ may further or alternatively represent one or more soft segment having siloxane groups such as described, e.g., in U.S. Patent Application Pub. No. 2010/0055322. In such an embodiment, $R_2$ may represent a segment derived from a polysiloxane group-containing prepolymer, and in a specific embodiment a polydimethyl siloxane (PDMS) group-containing prepolymer. The polysiloxane segment may be introduced into the polyurethane by using the prepolymer with both ends terminated with a hydroxyl (diol) or an amino (diamine) group. The prepolymer having terminal hydroxyl groups may be, e.g., a silanol or carbinol terminated polydimethyl siloxane, and that having terminal amine groups may be, e.g., an aminoalkyl terminated polydimethyl siloxane. The resulting polyurethanes are referred to as siloxane group functionalized, since they contain siloxane groups as part of the polymer composition.

$R_3$ is preferably the central portion of a monomeric unit containing a phosphoric acid, carboxylic acid or sulfonic acid group, most preferably being carboxylic acids, such as 2,2'-bis(hydroxymethyl)propionic acid, 2,2'-bis(hydroxymethyl) butyric acid, hydroxyethylether of 4,4'-bis(4-hydroxyphenyl) valeric acid. These materials may be prepared by any of the well known techniques in art of polyurethane manufacture, for example, processes disclosed in U.S. Pat. No. 4,335,029 Dadi, et al. assignee Witco Chemical Corporation (New York, N.Y.) and in Aqueous Polyurethane Dispersions B. K. Kim, Colloid & Polymer Science, Vol. 274, No. 7 (1996) 599-611 © Steinopff Verlag 1996.

Preferred polyurethanes for use in this invention have a sufficient amount of acid groups in the molecule to have an acid number from about 50 to about 150, more preferably 60 to 130 and most preferably 70 to 120 wherein, the acid number is defined as the milligrams of potassium hydroxide required to neutralize one gram of polymer. The acid number of the polymer may be calculated by the formula given in the following equation: Acid number=[(moles of acid monomer)*(56 grams/mole)*(1000)/(total grams of monomers)] where moles of acid monomer is the total moles of all acid group containing monomers that comprise the polymer, 56 is the formula weight for potassium hydroxide, and total grams of monomers is the summation of the weight of all the monomers, in grams, comprising the target polymer.

Polyurethane dispersions useful for the practice of the invention can be prepared by preparing a prepolymer having a relatively low molecular weight and a small excess of isocyanate groups and chain-extending with a chain extender the prepolymers into a high molecular weight polyurethane during the dispersion process. Such processes have been disclosed in, for example, U.S. Pat. No. 4,335,029 by Dadi, et al. assigned to Witco Chemical Corporation (New York, N.Y.); in "Aqueous Polyurethane Dispersions" by B. K. Kim, Colloid & Polymer Science, Vol. 274, No. 7 (1996) 599-611 © Steinopff Verlag 1996; and in "Polyurethane Dispersion Process)" by Mania et al. Paint and Coating Industry, January 2007, Page 30.

Preferred diamine chain extenders for the practice of the invention include ethylene diamine, diethylene triamine, propylene diamine, butylene diamine, hexamethylene diamine, cyclohexylene diamine, phenylene diamine, tolylene diamine, xylylene diamine, 3,3'-dinitrobenzidene, ethylene methylenebis(2-chloroaniline), 3,3'-dichloro-4,4'-biphenyl diamine. 2,6-diaminopyridine, 4,4'-diamino diphenylmethane, adducts of diethylene triamine with acrylate or its hydrolyzed products, hydrazine, and substituted hydrazines.

The polyurethane dispersions useful for the practice of this invention can also be prepared without involving the chain-extension step during the dispersion step. In the process the chemical reaction for forming urethane or urea linkages is completed prior to the dispersion step.

Polyurethanes used in the invention preferably have a minimum weight average molecular weight of at least 8,000. Preferably, the polyurethane has a maximum weight average molecular weight of 150,000. More preferably, the molecular weight of polyurethane is between about 10,000 and 100,000, and most preferably between about 15,000 and 50,000. Polyurethane dispersions useful for the practice of this invention preferably have a mean particle size of less than 100 nm and more preferably less than 50 nm.

The acid groups on the polyurethanes and the acrylic polymer dispersants when employed are at least partially neutralized (converted into salts) using organic or inorganic bases, preferably monovalent inorganic bases, and most preferably aqueous alkaline metal hydroxides, selected from; potassium hydroxide, sodium hydroxide, rubidium hydroxide or lithium hydroxide. In a preferred embodiment, at least 50 percent of the available acid groups on the polymer are converted into salts using monovalent inorganic base, more preferably at least 70% and most preferably at least 85% of the available acid groups are converted. From a manufacturing perspective, preferably less than 100% of the acid groups are neutralized as this can lead to lack of control of the pH of the inks. Monovalent inorganic bases are highly preferred over organic bases such as amines as the neutralizing agents for the acrylic and polyurethane polymers since inks containing polymers neutralized with organic amines show very poor jetting performance in a thermal inkjet printhead.

Surfactants may be added to adjust the surface tension of the ink to an appropriate level. In a particular embodiment, relative dynamic and static surface tensions of various pigment based inks and colorless protective ink of an ink set may be controlled as described in U.S. Patent Application Pub. No. 2008/0207805, the disclosure of which is incorporated by reference herein, to control intercolor bleed between the inks. In particular, where cyan, magenta, yellow, black and colorless inks are employed, the surface tensions of the inks may have the relationships wherein (i) the dynamic surface tension at 10 milliseconds surface age for all inks of the ink set is greater than or equal to 35 mN/m, (ii) the static surface tensions of the yellow ink and of the colorless protective ink are at least 2.0 mN/m lower than the static surface tensions of the cyan, magenta and black inks of the ink set, and (iii) the static surface tension of the colorless protective ink is at least 1.0 mN/m lower than the static surface tension of the yellow ink.

The surfactants may be anionic, cationic, amphoteric or nonionic and used at levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols from Air Products).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

A biocide (0.01-1.0% by weight) may also be added to prevent unwanted microbial growth which may occur in the ink over time. A preferred biocide for the inks employed in the present invention is Proxel® GXL (Zeneca Colours Co.) at a concentration of 0.05-0.1% by weight or/and Kordek® (Rohm and Haas Co.) at a concentration of 0.05-0.1% by weight (based on 100% active ingredient. Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Inorganic bases are preferred, however small amounts of organic bases, such as triethanolamine, may be used to adjust the pH of the ink. Useful inks may have a preferred pH of from about 4 to 10, depending upon the type of pigment being used. Preferably, the pH of the present ink is from 6 to 9, more preferably from 7.5 to 8.5.

The inks of the present invention can be printed through an inkjet printhead capable of achieving firing frequencies of at least 12 kHz with a near nozzle velocity of at least 10 meters/ second. Any of the known printhead designs in the art of inkjet printing may be used which are capable of achieving these high speed firing frequencies. Preferably, the inkjet printer is equipped with a thermal inkjet printhead. Particularly preferred printhead designs are disclosed in United States Patent Application Pub. Nos. 2006/0103691 and 2008/0136867, the disclosures of which are incorporated by reference herein.

Inks of the present invention may be applied to a photoglossy or plain paper receiver. The two types of receivers are distinguished from one another in that the photoglossy receiver is manufactured with a coated layer above the underlying paper support. Examples of plain papers include: Kodak bright white inkjet paper, Hewlett Packard Color inkjet paper, Xerox Extra Bright white inkjet paper, Georgia-Pacific inkjet Paper Catalog Number 999013, Staples inkjet paper International Paper Great White MultiUse 20 Paper, Xerox Premium Multipurpose Paper, Hammermill Copy plus or ForeMP paper, and Hewlett Packard Multipurpose paper. The plain papers may include papers that have been treated with multivalent salts during or after manufacture of the paper.

Inks of the present invention can be printed as digital images having photographic quality if a suitable recording medium, such as glossy inkjet paper, is used. Photoglossy receivers may be further categorized as being a swellable media (having a non-porous polymer coating) or a microporous media, although hybrid designs are also well known. The microporous media are typically comprised of water-absorbing fine particles or powders mixed with a polymeric hydrophilic binder to form a microporous structured coating. The hydrophilic particles or powders are typically polycrystalline inorganic materials such as boehmite alumina, porous and non-porous silicas (for example Sylojet or Ludox particles) or amorphous inorganic materials such as aluminum silicates or silica dispersions. Microporous photoglossy media are preferred due to their relatively quick drying capabilities and improved water-fastness and smudge resistance compared to swellable media. The design of the both plain paper and photoglossy media vary widely depending on materials and paper manufacturing processes and should not be construed to limit the scope of the present invention.

EXAMPLES

The following examples illustrate, but do not limit, the utility of the present invention.
Pigment Dispersions Aqueous pigment dispersions were prepared using a high speed mill equipped with polymeric milling media having a diameter of 50 microns. The type of mixing blade, the rotational speed of the mixer, milling time, the ratio of milling media to pigment, and the ratio of pigment to dispersant were varied to produce different pigment particle size distributions. Table I shows the pigment and dispersant type, and the resulting mean Stoke's diameter particle size and size coefficient of variation as determined by the disc centrifuge method.
Particle Size Measurement by Disc Centrifuge A CPS disc centrifuge model DC18000 (supplied from CPS Instruments Inc, 7349 SE Seagate Lane, Stuart, Fla., 34997, USA) was used to make the measurements. A pigment dispersion sample was injected into the instrument and the disc spun at 16,000 rpm. Sucrose solutions of 2 to 10% were used to create a density gradient necessary for stable sedimentation. It may take approximately 2 hours to sediment the smallest particles (approximately 10 nm). A Stoke's diameter particle size distribution is calculated from the sedimentation time using 1.49 g cm$^{-3}$ to be the density of the magenta pigment particles. From the measured distribution, Stoke's diameter particle size and width parameters are calculated based on the modified Stoke's law equation.
Typical Polymerically Dispersed Pigment Example M-1: A dispersion of magenta pigment Clarient E02 (solid solution of PR122 and PV19) dispersed with an acrylic copolymer A made from a monomer composition of 37 wt % benzyl methacrylate, 30 wt % n-octadecylmethacrylate, and 33 wt % methacrylic acid, having a weight average molecular weight of 8000 to 10000 as determined by the Size Exclusion Chromatography neutralized with potassium hydroxide (degree of neutralization of about 90%). The dispersion was prepared using a high tip speed on the mixing blade with the resulting mean Stoke's diameter particle size of 33.7 nm and a coefficient of variation of 0.356 as measured by disc centrifuge.
Typical Small-Molecule Dispersed Pigment Example M-30: A dispersion of magenta pigment Sun Quindo (solid solution of PR202 and PV19) dispersed with the potassium salt of oleoyl methyl taurate (KOMT). The dispersion was prepared using a high tip speed on the mixing blade with the resulting mean Stoke's diameter particle size of 28.2 nm and a coefficient of variation of 0.425 as measured by disc centrifuge.
Polyurethane Dispersions Used in the Ink Examples The polyurethane dispersion shown in the ink examples below typically has a particle size in the range from about 10 to about 40 nanometers in diameter. These sizes may change depending on the specific aqueous environment of the ink formulations. Unless otherwise stated, the polyurethanes dispersions are prepared by carrying out the polymerization reaction in either tetrahydrofuran (THF) or ethyl acetate using isophorone diisocyanate, 2,2-bis(hydroxymethyl) propionic acid, and a polyol or polyamine, neutralizing the resultant polymer with aqueous potassium hydroxide solution, diluting with additional deionized water if necessary, and removing volatile solvent by vacuum evaporation or stripping.

Polyurethane PU-1:

A 100 acid number polyurethane made with isophorone diisocyanate, 2,2-bis(hydroxymethyl)proprionic acid, and a 2000 Mw polytetrahydrofuran polyol where 95% of the acid groups are neutralized with potassium hydroxide. The weight average molecular weight of PU-1 is about 20,000.

Polyurethane PU-2:

A 76 acid number polyurethane made with isophorone diisocyanate and a combination of poly(hexamethylene carbonate) diol and 2,2-bis(hydroxymethyl)proprionic acid where 100% of the acid groups are neutralized with potassium hydroxide. The weight average molecular weight is about 25,000.
Magenta Ink for Polymerically Dispersed Pigment Evaluation in Table I, II, and III Into an approximately 250 ml high density polyethylene bottle with magnetic stirring, the following components were added in order as: high purity water, 2 wt % of glycerol, 7 wt % of 1-(2-hydroxyethyl)-2-pyrrolidinone, 6 wt % of 2-imidazolidone (from a 35% solution in water), 3 wt % of 1,2-hexanediol, 0.5 wt % of Surfynol 465 surfactant, 1 to 2 wt % of polyurethane PU-1 (from an approximately 25 wt % aqueous solution), 0.02 wt % of the biocide Kordek MLX, and 5% of the magenta pigment from the magenta pigment dispersion generally described above and listed in Table I. The resulting 240 g of ink were stirred for at least an hour and filtered with a 1.0 um disk filter.

Magenta Ink for Non-Polymeric Surfactant Dispersed Pigment Evaluation

Into an approximately 250 ml high density polyethylene bottle with magnetic stirring, the following components were added in order: high purity water, 13 wt % of glycerol, 3 wt % of 1,2-pentanediol, 0.75 wt % of Surfynol 465 surfactant, 1.2 wt % of polyurethane PU-2 (from an approximately 25% aqueous solution), 0.9% of an acrylic copolymer prepared from 67 wt % benzyl methacrylate and 33% methacrylic acid with about 85% of the acid groups neutralized with potassium hydroxide, 0.02 wt % of the biocide Kordek MLX, and 4.5% of the magenta pigment from the magenta pigment dispersions M-30 or M-31 listed in Table I. The resulting 240 g of ink were stirred for at least an hour and filtered with a 1.0 um disk filter.

Evaluation of Redissolution

Redissolution is evaluated by allowing 5.0 g of ink to dry in a flat-bottom dish for 18 hrs at 60 C. The state of the dry ink is noted, especially if crystals have formed. An ideal ink dries to a glassy appearance. After the ink dried ink is removed from the oven and allowed to cool to room temperature, 2.5 g of fresh ink is added and agitated every 15 to 30 minutes for 4 hrs. The degree of dissolution of the dried ink by the fresh ink is rated as follows:

1—indicates complete dissolution with no significant particles

2—some particles or a few small soft chunks may be present

3—significant soft and moveable chunks are present

4—a large amount of swollen often gel-like ink remains

5—the dried ink show little sign of swelling or dissolving

Intermediate ratings are possible by interpolating or averaging multiple measurements.

Evaluation of Plain Paper Curl

Curl is evaluated by printing on a plain paper substrate (STAPLES Copy Paper 30% recycled) a large rectangular patch of ink asymmetrically printed relative to the major axis of the paper such that it would cause severe curl on one side of the paper. The printed papers are left on a solid surface under normal room temperature and humidity conditions for 24 hrs and then the degree of curl is judged. Inks that cause the print to roll, especially those forming a tube are judged poor. Prints from inks that remain nearly flat or show modest bowing are judged acceptable or good.

Evaluation of Gloss

Gloss is evaluated by printing an area on a glossy photo media substrate (KODAK Ultra Premium Photo Paper—High Gloss) with the ink composition and measuring the 60-degree gloss of the printed image area on a BYK Gardner Gloss Meter.

TABLE I

Disc Centrifuge Particle size Results, Redissolution, and Gloss Results

| Ink | Dispersion | Dispersing agent | Mean Stoke's diameter particle Size (nm) | Standard Deviation (nm) | Coefficient of Variation (SD/Mean) | Pigment loading wt % | wt % Polyurethane level | Magenta Ink Redissolution | Average 60 deg gloss |
| --- | --- | --- | --- | --- | --- | --- | --- | --- | --- |
| Comp-1 | M-1 | Acrylic copolymer A | 33.7 | 12 | 0.356 | 5 | 2 | 4.4 | 85.55 |
| Comp-2 | M-2 | Acrylic copolymer A | 31.3 | 11.5 | 0.367 | 5 | 2 | 4.4 | 85.45 |
| Ink-1 | M-3 | Acrylic copolymer A | 38.8 | 13.5 | 0.348 | 5 | 2 | 2.5 | 85.35 |
| Ink-2 | M-4 | Acrylic copolymer A | 36.4 | 15.5 | 0.426 | 5 | 2 | 2.6 | 85.6 |
| Ink-3 | M-5 | Acrylic copolymer A | 36.8 | 14.5 | 0.394 | 5 | 2 | 2 | 85.1 |
| Ink-4 | M-6 | Acrylic copolymer A | 42.4 | 14.5 | 0.342 | 5 | 2 | 1.5 | 85.95 |
| Ink-5 | M-7 | Acrylic copolymer A | 43.5 | 14.5 | 0.333 | 5 | 2 | 1.3 | 90 |
| Ink-6 | M-8 | Acrylic copolymer A | 49.95 | 16 | 0.320 | 5 | 2 | 1 | 89.8 |
| Ink-7 | M-9 | Acrylic copolymer A | 43.5 | 14.5 | 0.333 | 5 | 2 | 1.3 | 87.85 |
| Ink-8 | M-10 | Acrylic copolymer A | 45 | 15 | 0.333 | 5 | 2 | 1 | 89.8 |
| Ink-9 | M-11 | Acrylic copolymer A | 45 | 15 | 0.333 | 5 | 2 | 1.6 | 86.3 |
| Ink-10 | M-12 | Acrylic copolymer A | 49.96 | 16 | 0.320 | 5 | 2 | 1.8 | 93.6 |
| Ink-11 | M-13 | Acrylic copolymer A | 52 | 14.5 | 0.279 | 5 | 2 | 1.5 | 94.2 |
| Comp-3 | M-14 | Acrylic copolymer A | 78.5 | 32.7 | 0.417 | 5 | 2 | 1.5 | 81.9 |
| Comp-4 | M-15 | Acrylic copolymer A | 74.45 | 31.14 | 0.418 | 5 | 2 | 1.5 | 79.4 |
| Comp-5 | M-19 | Acrylic copolymer A | 31.4 | 14 | 0.446 | 5 | 2 | 4.5 | |
| Ink-12 | M-20 | Acrylic copolymer A | 36.5 | 14.5 | 0.397 | 5 | 2 | 2.3 | |
| Ink-13 | M-21 | Acrylic copolymer A | 36.5 | 14 | 0.384 | 5 | 2 | 2.5 | |
| Ink-14 | M-22 | Acrylic copolymer A | 47.4 | 14.5 | 0.306 | 5 | 2 | 1.7 | |
| Ink-15 | M-23 | Acrylic copolymer A | 41.4 | 13 | 0.314 | 5 | 2 | 2.0 | |
| Comp-6 | M-25 | Acrylic copolymer A | 29.33 | 13.9 | 0.474 | 5 | 2 | 4 | |
| Ink-16 | M-26 | Acrylic copolymer A | 56.97 | 22.45 | 0.394 | 5 | 2 | 1 | |
| Ink-17 | M-27 | Acrylic copolymer A | 50.7 | 15.5 | 0.306 | 5 | 2 | 1 | |
| Ink-18 | M-28 | Acrylic copolymer A | 49.87 | 15.5 | 0.311 | 5 | 2 | 1 | |
| Comp-7 | M-29 | Acrylic copolymer A | 29.95 | 13.5 | 0.451 | 5 | 2 | 5 | |
| Comp-8 | M-24 | Acrylic copolymer A | 29.5 | 12 | 0.407 | 5 | 2 | 4 | |
| Ink-19 | M-10 | Acrylic copolymer A | 45 | 15 | 0.333 | 5.5 | 2 | 1.4 | |
| Ink-20 | M-10 | Acrylic copolymer A | 45 | 15 | 0.333 | 6 | 1 | 1 | |
| Ink-21 | M-10 | Acrylic copolymer A | 45 | 15 | 0.333 | 6.5 | 1 | 1.8 | |
| Ink-22 | M-10 | Acrylic copolymer A | 45 | 15 | 0.333 | 7 | 1 | 1.8 | |
| Comp-9 | M-30 | KOMT | 28.23 | 12 | 0.425 | 4.5 | 2 | 4 | |
| Ink-23 | M-31 | KOMT | 36.05 | 15.5 | 0.43 | 4.5 | 2 | 2.4 | |

TABLE II

Comparison of Disc Centrifuge Results with Dynamic Light Scattering Results

| Ink | Dispersion | Magenta Ink Redissolution | Disc Centrifuge Mean Stoke's diameter particle Size (nm) | Disc Centrifuge Standard Deviation (nm) | Disc Centrifuge Coefficient of Variation (SD/Mean) | Dynamic Light Scattering V10 | Dynamic Light Scattering V50 | Dynamic Light Scattering V90 | Dynamic Light Scattering V90-V10 | Dynamic Light Scattering (V90-V10)/V50 |
|---|---|---|---|---|---|---|---|---|---|---|
| Comp-2 | M-2 | 4.4 | 31.3 | 11.5 | 0.367 | 11.04 | 16.03 | 75.2 | 64.16 | 4.00 |
| Comp-1 | M-1 | 4.4 | 33.7 | 12 | 0.356 | 11.69 | 17.06 | 95.2 | 83.51 | 4.90 |
| Ink-2 | M-4 | 2.6 | 36.4 | 15.5 | 0.426 | 12.06 | 20.8 | 98.4 | 86.34 | 4.15 |
| Ink-3 | M-5 | 2 | 36.8 | 14.5 | 0.394 | 11.96 | 17.71 | 90.3 | 78.34 | 4.42 |
| Ink-1 | M-3 | 2.5 | 38.8 | 13.5 | 0.348 | 12.63 | 23.2 | 100.7 | 88.07 | 3.80 |
| Ink-4 | M-6 | 1.5 | 42.4 | 14.5 | 0.342 | 11.99 | 19.56 | 104.8 | 92.81 | 4.74 |
| Ink-5 | M-7 | 1.3 | 43.5 | 14.5 | 0.333 | 13.71 | 27.21 | 113 | 99.29 | 3.65 |
| Ink-7 | M-9 | 1.3 | 43.5 | 14.5 | 0.333 | 11.92 | 18.76 | 104.4 | 92.48 | 4.93 |
| Ink-8 | M-10 | 1 | 45 | 15 | 0.333 | 12.92 | 23.38 | 111.1 | 98.18 | 4.20 |
| Ink-9 | M-11 | 1.6 | 45 | 15 | 0.333 | 12.75 | 28.95 | 118.2 | 105.45 | 3.64 |
| Ink-6 | M-8 | 1 | 49.95 | 16 | 0.320 | 14.13 | 41.4 | 104.8 | 90.67 | 2.19 |
| Ink-10 | M-12 | 1.8 | 49.96 | 16 | 0.320 | 12.64 | 27.42 | 113.2 | 100.56 | 3.67 |

TABLE III

Redissolution and plain paper density as a function of pigment loading

| Ink | Dispersion | Disc Centrifuge Mean Stoke's diameter particle Size (nm) | Disc Centrifuge Coefficient of Variation (SD/Mean) | Pigment level wt % | redissolution | Density on Kodak Ultimate | Density on Staples 30% Recycled |
|---|---|---|---|---|---|---|---|
| Comp-10 | M-1 | 33.7 | 0.36 | 5.0 | 4.5 | 1.30 | 1.01 |
| Ink-24 | M-10 | 45.0 | 0.33 | 5 | 1 | 1.33 | 0.97 |
| Comp-11 | M-14 | 78.5 | 0.42 | 5 | 1 | 1.36 | 0.97 |
| Comp-12 | M-1 | 33.7 | 0.36 | 4.5 | 2.5 | 1.29 | 0.97 |
| Ink-25 | M-10 | 45.0 | 0.33 | 4.5 | 1.3 | 1.32 | 0.96 |
| Comp-13 | M-14 | 78.5 | 0.42 | 4.5 | 1 | 1.32 | 0.96 |
| Comp-14 | M-1 | 33.7 | 0.36 | 4 | 2.1 | 1.26 | 0.94 |
| Comp-15 | M-10 | 45.0 | 0.33 | 4 | 1 | 1.29 | 0.95 |
| Comp-16 | M-14 | 78.5 | 0.42 | 4 | 1 | 1.31 | 0.93 |
| Comp-17 | M-1 | 33.7 | 0.36 | 3 | 1 | 1.21 | 0.91 |
| Comp-18 | M-10 | 45.0 | 0.33 | 3 | 1 | 1.22 | 0.93 |
| Comp-19 | M-14 | 78.5 | 0.42 | 3 | 1 | 1.17 | 0.89 |

Table I shows that inks containing at least 4.5 wt % pigment made from pigment dispersions with a mean Stoke's diameter particle size greater than 35 nm have acceptable redissolution performance (with a preferred rating of about 2.5 or less). Inks made from dispersions with mean Stoke's diameter pigment size greater than 70 nm have an unacceptable gloss level of below 85 when printed on photo print media.

Table II shows that the sizing measurements determined by dynamic light scattering do not correlate with the Stoke's diameter particle sizing results from the disc centrifuge method, and would therefore not have shown the desired relationship between the redissolution results and the Stoke's diameter particle size and size distribution as determined by the disc centrifuge method.

Table III shows that as the pigment loading is reduced below 5% the density formed on both treated and untreated plain paper drops although the redissolution improves for all of the dispersions regardless of particle size. This shows that inks prepared with levels of pigment less than about 4.5% would not show poor redissolution performance from a dispersion outside the inventive size range.

Although Stoke's diameter particle size of the pigment dispersion is shown to be critical in Tables I-III, it has further been found that humectant selection can further impact the desired results, even when particle size is as desired for good redissolution at high pigment concentrations. Further Examples were prepared as described in Tables IV-V, with varying humectant compositions and concentrations, where Glyc is glycerol; 2-Pyr is 2-pyrrolidinone; HEP is 1-(2-hydroxyethyl)-2-pyrrolidinone; TEG is triethylene glycol; 1,2-HD is 1,2-hexanediol; and 2-Im is 2-imidazolidinone.

Ink Preparation for Magenta Inks Described in Table IV and V

Into an approximately 250 ml high density polyethylene bottle with magnetic stirring, the following components were added in order at levels specified in Tables IV and V unless otherwise stated: high purity water, glycerol, 1-(2-hydroxyethyl)-2-pyrrolidinone, 2-pyrrolidinone, imidazolidone, triethylene glycol, 1,2-hexanediol, 0.5 wt % of Surfynol 465 surfactant, 2 wt % of polyurethane PU-1 (from an approximately 25 wt % aqueous solution), 0.02 wt % of the biocide Kordek MLX, and 5% of the magenta pigment dispersion M-1. The resulting 240 g of ink were stirred for at least an hour and filtered with a 1.0 um disk filter.

TABLE IV

Humectant variations and crystallization, redissolution, and curl results

| Ink | dispersion | wt % Glyc | wt % HEP | wt % 2-Pyr | wt % 2-Im | wt % TEG | wt % 1,2-HD | % HEP + 2-Im + 2-pyr of total humectant | % 2-Im of total humectant | % glyc of total humectant | glyc as % of HEP + 2-Im | Crystals | Redissolution | curl |
|---|---|---|---|---|---|---|---|---|---|---|---|---|---|---|
| Comp-20 | M-1 | 2 | 11 | 0 | 2 | 0 | 3 | 72 | 11 | 11 | 15 | none | 4.0 | good |
| Comp-21 | M-1 | 2 | 9 | 0 | 4 | 0 | 3 | 72 | 22 | 11 | 15 | none | 3.7 | good |
| Comp-22 | M-1 | 2 | 7 | 0 | 6 | 0 | 3 | 72 | 33 | 11 | 15 | none | 3.8 | good |
| Comp-23 | M-1 | 2 | 5 | 0 | 8 | 0 | 3 | 72 | 44 | 11 | 15 | yes | 1.0 | good |
| Comp-24 | M-1 | 2 | 3 | 0 | 10 | 0 | 3 | 72 | 56 | 11 | 15 | yes | 1.7 | good |
| Ink-26 | M-9 | 2 | 5 | 0 | 8 | 0 | 3 | 72 | 44 | 11 | 15 | yes | 1.0 | good |
| Ink-27 | M-9 | 2 | 3 | 0 | 10 | 0 | 3 | 72 | 56 | 11 | 15 | yes | 1.0 | good |
| Ink-28 | M-9 | 2 | 0 | 5 | 8 | 0 | 3 | 72 | 44 | 11 | 25 | yes | 1.0 | poor |
| Ink-29 | M-9 | 2 | 0 | 7 | 6 | 0 | 3 | 72 | 33 | 11 | 33 | slight | 1.3 | poor |
| Ink-30 | M-9 | 2 | 0 | 9 | 4 | 0 | 3 | 72 | 22 | 11 | 50 | none | 1.2 | poor |
| Ink-31 | M-9 | 2 | 9 | 4 | 0 | 0 | 3 | 72 | 0 | 11 | 22 | none | 1.7 | poor |
| Ink-32 | M-9 | 2 | 7 | 6 | 0 | 0 | 3 | 72 | 0 | 11 | 29 | none | 1.6 | poor |
| Ink-33 | M-9 | 2 | 5 | 8 | 0 | 0 | 3 | 72 | 0 | 11 | 40 | none | 1.4 | poor |
| Ink-34 | M-9 | 4 | 3 | 0 | 6 | 0 | 3 | 56 | 38 | 25 | 44 | none | 4.1 | good |
| Ink-35 | M-9 | 5 | 6 | 0 | 4 | 0 | 3 | 56 | 22 | 28 | 50 | none | 3.5 | good |
| Ink-36 | M-9 | 2 | 3 | 0 | 6 | 4 | 3 | 50 | 33 | 11 | 22 | none | 3.0 | good |
| Ink-37 | M-9 | 2 | 5 | 0 | 4 | 4 | 3 | 50 | 22 | 11 | 22 | none | 3.3 | good |
| Ink-38 | M-9 | 2 | 5 | 0 | 4 | 4 | 3 | 50 | 22 | 11 | 22 | none | 2.6 | good |
| Ink-39 | M-9 | 2 | 7 | 0 | 2 | 4 | 3 | 50 | 11 | 11 | 22 | none | 3.5 | good |
| Ink-40 | M-9 | 2 | 8 | 0 | 1 | 4 | 3 | 50 | 6 | 11 | 22 | none | 2.8 | good |
| Ink-41 | M-9 | 2 | 4 | 0 | 4 | 5 | 3 | 44 | 22 | 11 | 25 | none | 3.3 | good |
| Ink-42 | M-9 | 2 | 5 | 0 | 3 | 5 | 3 | 44 | 17 | 11 | 25 | none | 3.3 | good |
| Ink-43 | M-9 | 2 | 6 | 0 | 2 | 5 | 3 | 44 | 11 | 11 | 25 | none | 2.8 | good |
| Ink-44 | M-9 | 2 | 7 | 0 | 1 | 5 | 3 | 44 | 6 | 11 | 25 | none | 2.9 | good |
| Ink-45 | M-9 | 2 | 1 | 0 | 6 | 6 | 3 | 39 | 33 | 11 | 29 | none | 4.0 | good |
| Ink-46 | M-9 | 2 | 3 | 0 | 4 | 6 | 3 | 39 | 22 | 11 | 29 | none | 4.1 | good |

TABLE V

Humectant variations and crystallization, redissolution, and curl results

| Ink | dispersion | wt % Glyc | wt % HEP | wt % 2-Pyr | wt % 2-Im | wt % TEG | wt % 1,2-HD | % HEP + 2-Im + 2-pyr of total humectant | % 2-Im of total humectant | % glyc of total humectant | glyc as % of HEP + 2-Im | Crystals | Redis-solution | curl |
|---|---|---|---|---|---|---|---|---|---|---|---|---|---|---|
| Ink-47 | M-9 | 2 | 11 | 0 | 2 | 0 | 3 | 72 | 11 | 11 | 15 | none | 1.8 | good |
| Ink-48 | M-9 | 2 | 9 | 0 | 4 | 0 | 3 | 72 | 22 | 11 | 15 | none | 1.3 | good |
| Ink-49 | M-9 | 2 | 7 | 0 | 6 | 0 | 3 | 72 | 33 | 11 | 15 | none | 1.0 | good |
| Ink-50 | M-9 | 2 | 8 | 0 | 4 | 1 | 3 | 67 | 22 | 11 | 17 | none | 1.0 | good |
| Ink-51 | M-9 | 2 | 7 | 0 | 5 | 1 | 3 | 67 | 28 | 11 | 17 | none | 1.0 | good |
| Ink-52 | M-9 | 2 | 6 | 0 | 6 | 1 | 3 | 67 | 33 | 11 | 17 | none | 1.0 | good |
| Ink-53 | M-9 | 0 | 7 | 0 | 4 | 4 | 3 | 61 | 22 | 0 | 0 | none | 1.3 | good |
| Ink-54 | M-9 | 1 | 7 | 0 | 4 | 3 | 3 | 61 | 22 | 6 | 9 | none | 1.5 | good |
| Ink-55 | M-9 | 2 | 7 | 0 | 4 | 2 | 3 | 61 | 22 | 11 | 18 | none | 1.0 | good |
| Ink-56 | M-9 | 2 | 7 | 0 | 4 | 2 | 3 | 61 | 22 | 11 | 18 | none | 1.0 | good |
| Ink-57 | M-9 | 3 | 7 | 0 | 4 | 1 | 3 | 61 | 22 | 17 | 27 | none | 1.3 | good |
| Ink-58 | M-9 | 4 | 7 | 0 | 4 | 0 | 3 | 61 | 22 | 22 | 36 | none | 1.5 | good |
| Ink-59 | M-9 | 2 | 6 | 0 | 5 | 2 | 3 | 61 | 28 | 11 | 18 | none | 1.0 | good |
| Ink-60 | M-9 | 2 | 5 | 0 | 6 | 2 | 3 | 61 | 33 | 11 | 18 | none | 1.3 | good |
| Ink-61 | M-9 | 4 | 5 | 0 | 6 | 0 | 3 | 61 | 33 | 22 | 36 | none | 1.4 | good |
| Ink-62 | M-9 | 2 | 10 | 0 | 0 | 3 | 3 | 56 | 0 | 11 | 20 | none | 2.3 | good |
| Ink-63 | M-9 | 2 | 9 | 0 | 1 | 3 | 3 | 56 | 6 | 11 | 20 | none | 2.0 | good |
| Ink-64 | M-9 | 2 | 8 | 0 | 2 | 3 | 3 | 56 | 11 | 11 | 20 | none | 1.7 | good |
| Ink-65 | M-9 | 2 | 7 | 0 | 3 | 3 | 3 | 56 | 17 | 11 | 20 | none | 2.0 | good |
| Ink-66 | M-9 | 0 | 6 | 0 | 4 | 5 | 3 | 56 | 22 | 0 | 0 | none | 1.3 | good |
| Ink-67 | M-9 | 1 | 6 | 0 | 4 | 4 | 3 | 56 | 22 | 6 | 10 | none | 1.0 | good |
| Ink-68 | M-9 | 2 | 6 | 0 | 4 | 3 | 3 | 56 | 22 | 11 | 20 | none | 1.3 | good |
| Ink-69 | M-9 | 3 | 6 | 0 | 4 | 2 | 3 | 56 | 22 | 17 | 30 | none | 2.0 | good |
| Ink-70 | M-9 | 4 | 6 | 0 | 4 | 1 | 3 | 56 | 22 | 22 | 40 | none | 2.4 | good |
| Ink-71 | M-9 | 2 | 6 | 0 | 4 | 3 | 3 | 56 | 22 | 11 | 20 | none | 1.3 | good |
| Ink-72 | M-9 | 2 | 5 | 0 | 5 | 3 | 3 | 56 | 28 | 11 | 20 | none | 1.5 | good |
| Ink-73 | M-9 | 2 | 4 | 0 | 6 | 3 | 3 | 56 | 33 | 11 | 20 | none | 1.0 | good |
| Ink-74 | M-9 | 2 | 3 | 0 | 6 | 2 | 3 | 56 | 38 | 13 | 22 | none | 1.8 | good |
| Ink-75 | M-9 | 0 | 3 | 0 | 6 | 4 | 3 | 56 | 38 | 0 | 0 | slight | 1.2 | good |
| Ink-76 | M-10 | 2 | 7 | 0 | 6 | 0 | 0 | 87 | 40 | 13 | 15 | none | 1 | good |
| Ink-77* | M-10 | 2 | 7 | 0 | 6 | 0 | 3 | 72 | 33 | 11 | 15 | none | 1.5 | good |

Table IV lists the ink formulations that show that dispersions that do not meet the inventive requirements with regard to particle size will show poor redissolution even if preferred humectant concentration formulation requirements are met (Comparatives 20-22). Comparatives 23 and 24 show that good redissolution performance can be obtained with a poor dispersion, but it requires a relatively high level (e.g., 8 wt % or more) of imidazolidone such that the ink crystallizes during dry-down. Inks 26 and 27 are further examples which demonstrate crystallization, in this case with an inventive pigment dispersion but without preferred humectant concentrations. Inks 28 through 33 show that good redissolution can be obtained with 2-pyrrolidononone replacing HEP or imidazolidone, but the curl performance is poor with excessive levels of this humectant (e.g., at 4 wt % and higher). Inks 34 and 35 show that poor redissolution may also result if the glycerol level is too high. The remaining Inks 36-46 show that poor redissolution may also result when the combined level of HEP and optionally imidazolidone is less than or equal to 50% of the total humectants.

Table V lists ink formulations with the inventive pigment dispersion particle size and concentration and preferred humectant concentrations and shows that good redissolution performance (e.g., rating of about 2.5 or less) consistently results when the combined level of HEP and optionally imidazolidone is greater than 50% of the total humectants level and the optional imidazolidone is less than 41% of the total humectants and glycerol is also optional with a level less than 25% of the total humectants. Inks 76 and 77 show that 1,2-hexanediol and polyurethane are also optional, and good redissolution can also be obtained without these components in the formulation.

Tables IV and V thus demonstrate the desired ink performance obtained for ink compositions in accordance with preferred humectant concentration embodiments of the present invention.

The invention has been described with reference to preferred embodiments. However, it will be appreciated that variations and modifications can be effected by a person of ordinary skill in the art without departing from the scope of the invention.

The invention claimed is:

1. An inkjet ink composition comprising;
   (a) water,
   (b) dispersed pigment particles, and
   (c) at least one humectant,
   wherein the pigment particles are present from about 4.5% by mass to about 10% by mass, and the pigment particles have a mass weighted mean Stoke's diameter of from about 35 nm to about 70 nm.

2. The ink composition of claim 1, wherein the pigment particles are dispersed with a polymeric dispersant.

3. The ink composition of claim 2, further comprising at least one water-dispersible polymer binder.

4. The ink composition of claim 3, wherein the at least one humectant comprises at least one pyrrolidinone compound.

5. The ink composition of claim 3, wherein the at least one humectant comprises 1-(2-hydroxyethyl)-2-pyrrolidinone, 2-pyrrolidinone, imidazolidone or glycerol, or a combination of any two or more thereof.

6. The ink composition of claim 5, wherein the sum of the amounts of 1-(2-hydroxyethyl)-2-pyrrolidinone, 2-pyrrolidinone and imidazolidone is greater than 50 weight % of the total humectant concentration of the ink composition.

7. The ink composition of claim 6, wherein the amount of 1-(2-hydroxyethyl)-2-pyrrolidinone is at least 10 weight % of the total humectant concentration, the amount of imidazolidone is less than 41% of the total humectant concentration, the amount of glycerol is less than 25 weight % of the total humectant concentration, and the amount of 2-pyrrolidinone is less than 25 weight % of the total humectant concentration.

8. The ink composition of claim 7, further comprising a 1,2 alkanediol.

9. The ink composition of claim 8, wherein the 1,2-alkanediol is selected from 1,2-pentanediol and 1,2-hexanediol.

10. The ink composition of claim 7, comprising imidazolidone present at greater than 0.1 weight percent.

11. The ink composition of claim 10, wherein the imidazolidone is present at less than 13 weight percent.

12. The ink composition of claim 7, wherein the at least one humectant further comprises triethylene glycol.

13. The ink composition of claim 7, wherein the polymeric dispersant for the pigment particles comprises a hydrophobic monomer having a carbon chain length of greater than or equal to 12 carbons.

14. The ink composition of claim 7, wherein the at least one water-dispersible binder is a polyurethane having an acid number between about 50 and 150 and molecular weight less than about 150,000.

15. The ink composition of claim 6 wherein the at least one humectant comprises at least 1-(2-hydroxyethyl)-2-pyrrolidinone, and
   wherein imidazolidone, if present, is present in an amount less than about 7 weight %,
   wherein the sum of the amounts of 1-(2-hydroxyethyl)-2-pyrrolidinone and imidazolidone is greater than or equal to 9 weight %,
   wherein the sum of the amounts of 1-(2-hydroxyethyl)-2-pyrrolidinone and imidazolidone is greater than 50% of the total humectant concentration, and
   wherein the amounts of 2-pyrrolidinone and glycerol, if present, are each less than 25% of the total humectant concentration.

16. The ink composition of claim 15 wherein the total humectant content is from about 12 weight % to about 24 weight %.

17. The ink composition of claim 16, comprising 2-pyrrolidinone at from 0 to less than 4 weight %.

18. The ink composition of claim 17, comprising 2-pyrrolidinone at less than 2 weight %.

19. The ink composition of claim 1, wherein the pigment particles are present at from about 4.5% by mass to about 7.5% by mass.

20. The ink composition of claim 1, wherein the pigment particles have a mass weighted mean Stoke's diameter of from about 39.0 nm to about 57.0 nm.

21. The ink composition of claim 1, wherein the pigment particles are magenta pigment particles.

* * * * *